July 4, 1961

G. R. PIERSON 2,991,415

FREQUENCY SENSITIVE SCALER

Filed Sept. 20, 1957

INVENTOR.
GEORGE R. PIERSON

BY John A. Duffy

AGENT

July 4, 1961   G. R. PIERSON   2,991,415
FREQUENCY SENSITIVE SCALER
Filed Sept. 20, 1957   3 Sheets-Sheet 3

INVENTOR.
GEORGE R. PIERSON
BY John A. Duffy

AGENT

United States Patent Office 2,991,415
Patented July 4, 1961

2,991,415
FREQUENCY SENSITIVE SCALER
George R. Pierson, Granada Hills, Calif., assignor to North American Aviation, Inc.
Filed Sept. 20, 1957, Ser. No. 685,104
9 Claims. (Cl. 324—78)

This invention relates to a frequency responsive device and more particularly to a device for producing decimally scaled output pulses directly proportional to the repetition rate of an electrical signal whose wave shape is varying in amplitude, width, and symmetry.

Devices for measuring and recording cyclic phenomena are well-known. A frequency measuring device measures the frequency of electrical oscillations or cyclically repeated voltage pulses and directly indicates the frequency on a suitable recording device. In order to permit output analysis of the data, a system for counting the output pulses appearing on the recording device is necessary. Counting systems heretofore employed have a plurality of static equilibrium states and are adapted to be transferred from one state to another upon the occurrence of each input pulse. Thus the state of static equilibrium in which the circuit is found after the occurrence of the input pulses to be counted constitutes a measure or count of the number of pulses having so occurred. However, since the number of such equilibrium static states, which may be obtained is very limited, it is common to scale the incoming pulses by cascading scaler stages. Many circuits suitable for scaling are now well-known. A common scaling circuit is one which scales by two, called the binary scaler. Another is the decade scaler which scales by 10. Decade scalers in general have been relatively complex, requiring a large number of tubes and other electrical components. In addition, such scalers have not been sufficiently stable and reliable for accurate counting.

Frequency measuring devices for counting and scaling voltages of conventional wave shapes are also well-known. However, these devices require a symmetrical wave shape input of constant width and amplitude such as a sine wave in order to measure the frequency with any desirable degree of accuracy. A random wave shape input requires special electronic circuits to correct for the errors induced in the measuring circuits when the wave shape is inserted in the input. The stability and linearity in the recording devices of non-frequency measuring instruments are wholly inadequate for input signals of random wave shapes.

The device of this invention overcomes the above-mentioned disadvantages by providing an electronic scaling and counting device of simple construction and standard parts which produce a decimally scaled output signal proportional to the frequency of a random wave input signal. The output signal is an accurate measurement which is independent of the amplitude, width, and symmetry of the input wave shape. A particular advantage of this circuit is the use of standard parts of reasonable accuracy which provide a highly accurate output signal which can be easily read from a standard recorder.

According to the device of this invention, an input signal of random wave form such as may be received from a flowmeter, tachometer, or other well-known measuring instruments is converted into a series of standard pulses of constant amplitude and duration. The pulses are recorded on a standard recording device with every tenth pulse of amplitude twice that of the unit pulses and every hundredth pulse with an amplitude three times the amplitude of the unit pulses. An accurate and easily readable record of the input signal is produced.

It is therefore an object of this invention to provide an improved frequency measuring device.

It is another object of this invention to provide a frequency measuring device independent of variations in amplitude of the input signal.

It is still another object of this invention to provide a frequency responsive device which measures the frequency of a non-symmetrical wave input signal.

It is a further object of this invention to provide a frequency measuring device which converts a random wave alternating current input into a decimally scaled output pulse signal.

It is a still further object of this invention to provide an improved scaling device.

Other objects of this invention will become apparent from the following description taken in connection with the accompanying drawings, in which FIG. 1 is a block diagram illustrating the device of this invention;

Figure 1:
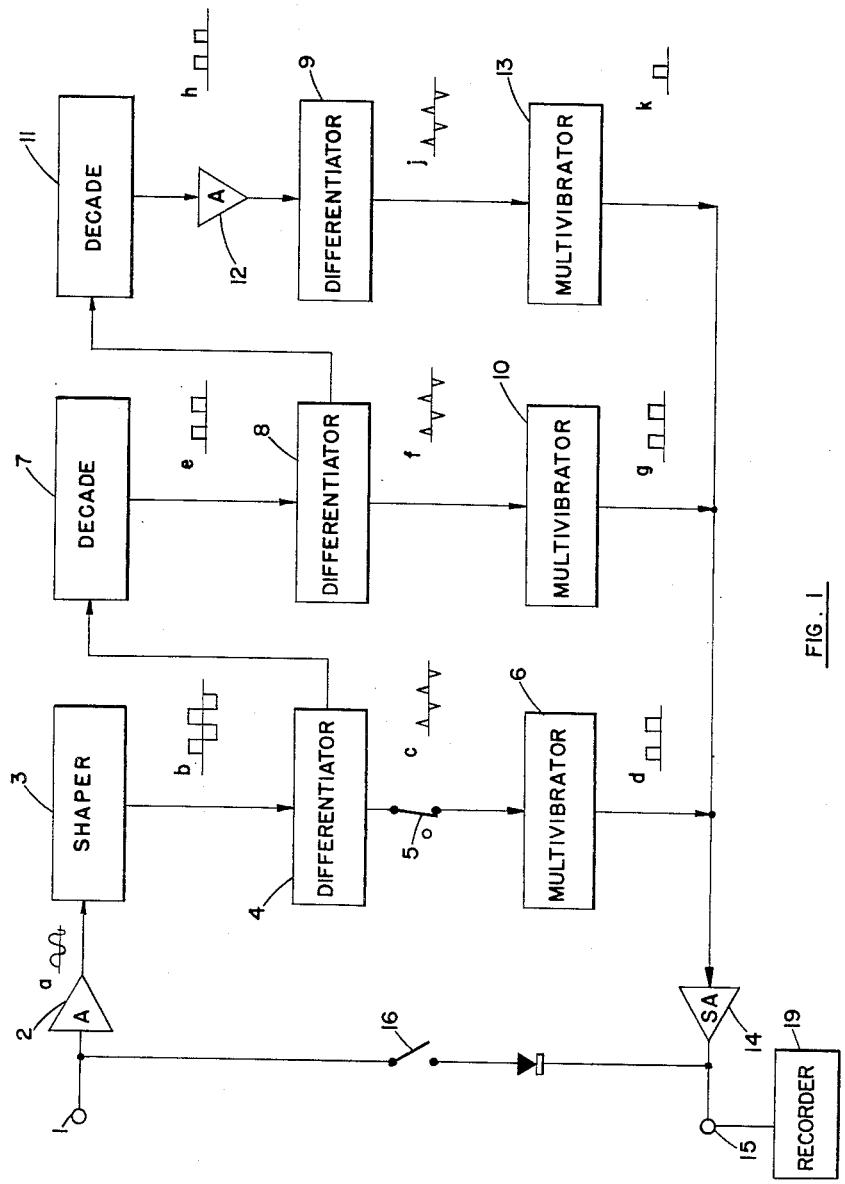

Referring now to FIG. 1, the frequency sensitive scaler comprises a series of circuits shown in block diagram. The random wave input signals to be measured are received at input terminal 1 which is connected to amplifier 2. The wave shapes presented to terminal 1 may be of any wave shape or amplitude and may be non-symmetrical about the voltage axis. Such a wave shape might be produced by a turbine-type flowmeter used to measure the amount of fluid flowing in a pipe. Amplifier 2 strengthens the random wave signal received from terminal 1 and feeds the output into shaper 3 which converts the random wave to an essentially square wave of constant amplitude. Shaper 3 shapes or limits the random wave to a predetermined voltage level in both the positive and negative polarities of the wave. Differentiator 4 converts the alternate square waves produced by shaper 3 into trigger pulses of negligible width which are bi-directional and proportional in amplitude and number to the square wave output of shaper 3. Multivibrator 6, of the monostable type, is connected to receive the pulses from differentiator 4 and convert these pulses into a series of square wave type pulses of unipolarity. The output of multivibrator 6, which consists of square wave pulses of the same polarity, duration, and amplitude, is fed to summing amplifier 14. Each pulse presented by multivibrator 6 to summing amplifier 14 represents one cycle of the random wave input signal received at terminal 1. The trigger pulses of differentiator 4 are also presented to decade device 7 which divides the input pulses by ten and presents one output pulse to differentiator 8 for every 10 input pulses received from differentiator 4. Differentiator 8 changes the square wave pulses produced by decade 7 into bi-directional trigger pulses of negligible width which are proportional in amplitude and number to the square-wave pulse output from decade 7. Monostable multivibrator 10 receives the pulses from differentiator 8 and converts these pulses into a series of square wave type pulses. The output of multivibrator 10, which consists of square wave pulses of the same polarity, duration, and amplitude, is fed to summing amplifier 14 in common with the output of multivibrator 6. Each pulse presented by multivibrator 10 to summing amplifier 14 represents 10 cycles of the input signal at terminal 1. The trigger pulses from the output of differentiator 8 are also presented to decade device 11 which divides the pulses received by ten and presents one output pulse to amplifier 12 for every 10 input pulses received from differentiator 8. Amplifier 12 increases the amplitude of the pulses received from decade 11 and presents the strengthened pulses to differentiator 9. Differentiator 9 receives the uni-polarity pulses from amplifier 12 and converts these pulses into bi-directional trigger pulses of negligible width which are proportional in amplitude and number to the square wave pulse output from decade 11. Monostable multivibrator 13 receives the pulses from differentiator 9 and produces a series of square waves pulses of the same polarity, duration, and amplitude. The output of multivibrator 13, consisting of square wave pulses of the same polarity, duration, and amplitude, is fed to summing amplifier 14 in common with the outputs of multivibrators 6 and 10. Each pulse presented by multivibrator 13 to summing amplifier 14 represents 100 cycles of the input signal at terminal 1. Summing amplifier 14 adds the outputs received from multivibrators 6, 10, and 13 and presents a series of constant amplitude and duration pulses to output terminal 15, which may be connected to an external recording device 19. The signal presented at terminal 15 consists of a series of pulses of a predetermined constant amplitude with every tenth pulse twice the amplitude of the predetermined unit pulse and every hundredth pulse three times the amplitude of the unit pulses. Normally closed switch 5 is connected in series between differentiator 4 and multivibrator 6. When switch 5 is open, summing amplifier 14 no longer receives any unit pulses from multivibrator 6. Normally open switch 16 provides a fail safe circuit between input terminal 1 and output terminal 15 in case of failure in the scaler circuitry.

In operation, assume an input signal at terminal 1 of random wave form as shown by wave form "a." The signal is clipped by shaper 3 to provide a square wave of constant amplitude, as indicated by wave form "b." Differentiator 4 converts the square wave into bi-directional pulses of negligible width proportional in repetition to the frequency of the input signals at terminal 1, as indicated by wave form "c." Multivibrator 6 operates on the output from differentiator 4 to produce a series of pulses of predetermined constant amplitude and duration to summing amplifier 14, as shown by wave from "d." Decade 7 receives the output pulses from differentiator 4 (wave form "c"), each pulse representing a unit of the input signal, and provides an output pulse to differentiator 8 for every 10 input pulses from differentiator 4 as shown by wave form "e." Differentiator 8 presents multivibrator 10 with short duration pulses, as shown by wave form "f." Multivibrator 10 operates on the output of differentiator 8 to produce a series of constant amplitude and duration pulses, as shown by wave form "g," each pulse representing 10 cycles of the input signal. Decade 11 further divides the pulses from differentiator 8 by 10, presenting output pulses through amplifier 12 (wave form "h") to differentiator 9. Differentiator 9 produces a series of short duration pulses, each pulse representing 100 cycles of the input signal as shown by wave form "j."

By adding the output pulse signals from multivibrators 6, 10, and 13 in summing amplifier 14 (wave forms "d," "g," and "k"), an output signal is provided at terminal 15 in which a constant duration and amplitude pulse is produced for each of the first 9 cycles of the input signal, a constant duration but double amplitude pulse is produced for the 10th cycle, and a constant duration but three times the amplitude pulse is produced for the 100th cycle.

Figure 2:
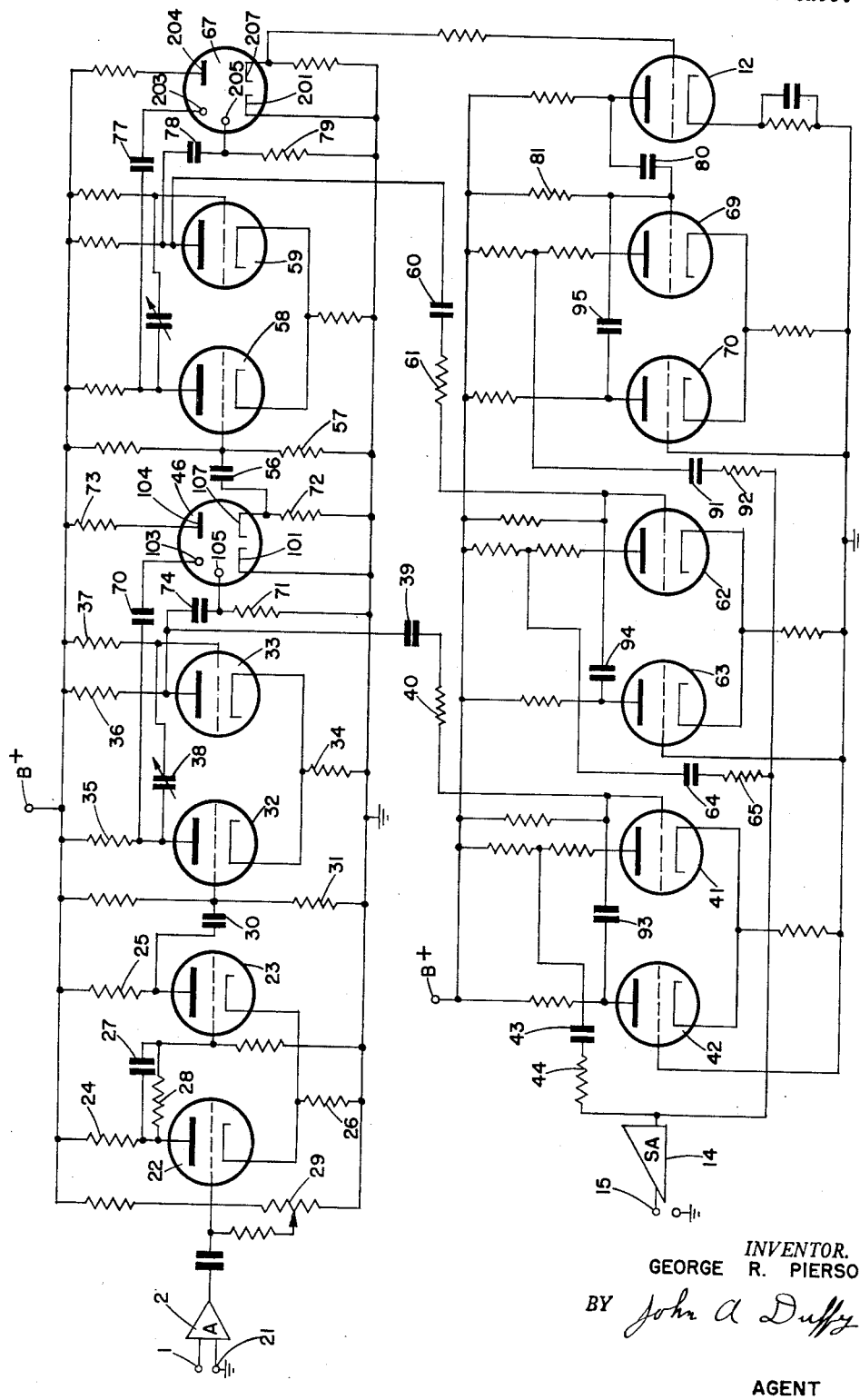
FIG. 2 is a schematic diagram of the device of this invention.

Referring now to FIG. 2, a circuit diagram of an operative embodiment of the invention is shown. Amplifier 2, which is preferably a standard low frequency low impedance alternating current amplifier, has input terminals 1 and 21 connected to receive the input signal which may be of random wave form. The output of amplifier 2 is connected to the grid of triode 22 through a coupling condenser. Triodes 22 and 23 form a bistable multivibrator which produces an output which is a replica of the input signal shaped to form an alternating square wave. The plate of triode 22 is connected through resistor 24 to a B+ supply which also is connected through resistor 25 to the plate of triode 23. Triodes 22 and 23 are cathode coupled through resistor 26 to ground. The plate of triode 22 is coupled to the grid of triode 23 through a circuit provided by capacitor 27 and resistor 28 in parallel. Variable resistor 29 connected between the B+ supply and ground has a wiper connected to the grid of triode 22 to provide for adjustment of the operating potential of triode 22.

Triode 22 is rendered conductive and triode 23 non-conductive by a positive-going wave form impressed upon the grid of triode 22. Conversely triode 22 is rendered non-conductive and triode 23 conductive by a negative-going wave form on the grid of triode 22. Depending upon the tendency of the random wave input to go more positive than negative, or vice versa, either triode 22 or triode 23 may be made normally conductive. By adjusting the wiper on variable resistor 29, the voltage between the grid of triode 22 and ground may be varied. Adjusting the voltage on the grid of triode 22 to a point where normally this voltage is positive with respect to the cathode makes triode 22 normally conductive. Thus for example, if the input wave form at terminals 1 and 21 has a tendency to go more positive than negative, resistor 29 would be adjusted to make triode 22 normally conductive.

The square wave output from shaper 3 is taken from the plate of triode 23 and differentiated by capacitor 30 and resistor 31 and connected to the grid of triode 32. Triodes 32 and 33 form a monostable multivibrator. Normally conducting triode 33 and non-conducting triode 32 are cathode coupled through resistor 34 to ground. The plate of triode 32 is connected through resistor 35 to the B+ supply and the plate of triode 33 is connected through resistor 36 to the B+ supply. Resistor 37 and variable capacitor 38, connected in series between the B+ supply and the plate of triode 33 form a time constant charging device to vary the conduction time of triode 33. One output from the multivibrator is taken from the plate of triode 33 and coupled through capacitor 39 and resistor 40 to the grid of triode 41. Triodes 41 and 42 form monostable multivibrator 6. Multivibrator 6 is operatively connected as described for the multivibrator of triode 32 and 33. The output of multivibrator 6 taken from the plate of triode 41 is coupled through capacitor 43 and resistor 44 to the input of summing amplifier 14. Resistor 44 is chosen of high enough value to produce a substantially square wave pulse.

Triodes 32 and 33 are also operatively connected to glow transfer tube 46 to produce a decade counter. Glow transfer tube 46 is a cold cathode, bi-directional, decade counter tube, which receives input signals from triodes 32 and 33 and produces an output signal which divides the input pulses, presented to the grid of triode 32, by ten. The plate of triode 32 is coupled to intermediate electrode 103 through capacitor 70 and the plate of triode 33 is coupled to intermediate electrode 105 through capacitor 74 and resistor 71. Cathode electrode 101 is connected to ground and output cathode 107 is connected through resistor 72 to ground. Plate electrode 104 is connected through resistor 73 to B+. Glow transfer tube 46 is a decade counter tube which may be, for example, as shown in FIG. 2, a Dekatron tube. The diagram shown in FIG. 2 shows the output connections only. The internal circuitry of the tube and detailed operation may be found in the electronic literature, for example, in the Electronic Engineering Magazine published by McGraw-Hill. The issue of May 1950, an article entitled "The Dekatron" gives a full explanation of the operation of the decade counter.

The output of decade tube 46 taken from cathode electrode 107 is differentiated by the circuit of capacitor 56 and resistor 57 forming differentiator 8 and is presented to the grid of triode 58. Triodes 58 and 59 form a monostable multivibrator which is connected in the same manner as the multivibrator of tubes 32 and 33. One output of the multivibrator is taken from the plate of triode 59 and coupled through capacitor 60 and resistor 61 to the grid of triode 62. Triodes 62 and 63 form monostable multivibrator 10 which is connected in the same manner as the multivibrator of tubes 32 and 33. The output of multivibrator 10, taken from the plate of triode 62, is coupled through capacitor 64 and resistor 65 to the input of summing amplifier 14.

Triodes 58 and 59 are also operatively connected to glow transfer tube 67. The plate of triode 58 is coupled to intermediate electrode 203 through capacitor 77 and the plate of triode 59 is coupled to intermediate electrode 205 through capacitor 78 and resistor 79. The other operating connections to tube 67 are the same as described for tube 46. The output of decade tube 67 is taken from cathode electrode 207 and connected to the grid of amplifier 12. The output of amplifier 12, taken from its plate, is connected to capacitor 80 and resistor 81 which form differentiator 9. The output of differentiator 9 is connected to the grid of triode 69. Triode 69 and triode 70 form multivibrator 13 which is connected in the same manner as the multivibrator of tubes 32 and 33. The output of multivibrator 13, taken from the plate of triode 69 is coupled through capacitor 91 and resistor 92 to the input of summing amplifier 14.

Multivibrators 6, 10, and 13 are all monostable multivibrators which are triggered by negative pulses. The connections which form the above multivibrators are the same except for capacitors 93, 94, and 95 which are the coupling capacitors in the multivibrators. By setting the value of these capacitors, multivibrators 6, 10, and 13 may be adjusted to trigger with a predetermined time delay. For example, the hundredth cycle of the input signal will produce trigger pulses which will trigger all three of the multivibrators. However, in order to insure that the output pulses from these multivibrators will all arrive at the input of summing amplifier 14 at the same time, multivibrator 10 is adjusted to delay its output pulse from that of multivibrator 6 and multivibrator 13 is adjusted to delay its output pulse from that of multivibrator 10. Thus, the time delay in the other associated circuitry of the scaler is compensated for by introducing a time delay in multivibrators 10 and 13.

Figure 3:
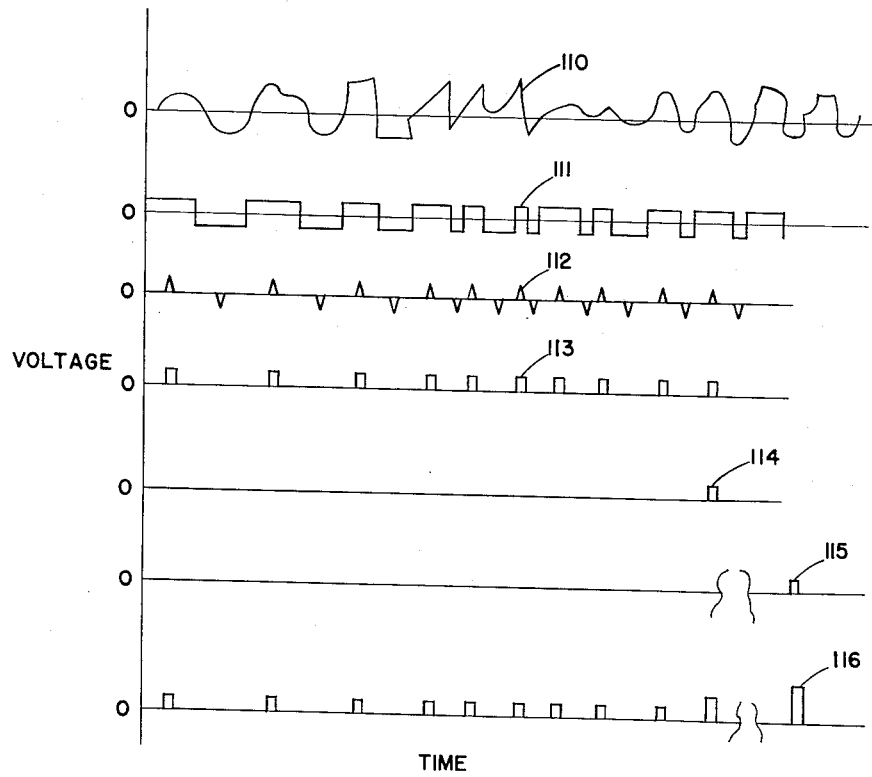
FIG. 3 illustrates a graph from the wave forms at various points in the device of FIG. 2.

In operation, taking the circuit diagram of the invention as shown in FIG. 2 with references to the curves shown in FIG. 3, the wave form whose frequency is to be measured is applied to input terminals 1 and 21. The input wave form may be any wave form including a random wave form as shown in curve 110 of FIG. 3 which is varying in width, amplitude, and symmetry about the voltage axis. Amplifier 2, operating in a conventional manner, provides an amplified output to the grid of triode 22. Assuming triode 22 is non-conducting before the wave of curve 110 swings positive, at a predetermined positive voltage triode 22 will commence conduction lowering its plate voltage which, coupled to the grid of triode 23 cuts off triode 23. When wave form 110 falls to a predetermined negative voltage triode 23 conducts and triode 22 is cut off. The output from the plate of triode 23, as shown in curve 111, is a square wave symmetrical about the voltage axis, of constant amplitude and proportional in width to the wave form of curve 110. The square wave of curve 111 produced by shaper 3 is differentiated by the circuit of capacitor 30 and resistor 31 to produce bi-directional pulses of negligible width and proportional in amplitude and frequency to the wave form of curves 110 and 111 as shown by wave form 112. The differentiated pulses are connected to the grid of triode 32. When a positive pulse from differentiator 4 is applied to the grid of triode 32, the plate of triode 32 produces a negative pulse which is coupled to electrode 103 of decade tube 46 and the plate of triode 33 produces a negative pulse a short time later which is coupled to electrode 105 of tube 46. The tenth positive pulse applied to the grid of triode 32 produces a positive pulse output at cathode electrode 107 of tube 46. The negative pulses produced at the plate of triode 33 are also coupled to the grid of triode 41 which in cooperation with triode 42 produces a positive pulse output at the plate of triode 42 for every negative pulse input to the grid of triode 32 as shown in wave form 113. The output at cathode electrode 107 is differentiated by capacitor 56 and resistor 57 which form differentiator 8 and the output is fed to the grid of triode 58. Triodes 58 and 59 in cooperation with decade tube 67 produce a positive output pulse at cathode electrode 207 for every ten positive pulses applied to the grid of triode 58. When a positive pulse from differentiator 8 is applied to the grid of triode 58, the plate of triode 59 produces a negative pulse which is coupled to the grid of triode 62, which in cooperation with triode 63 produces a positive pulse output at the plate of triode 63 for every tenth negative pulse input to the grid of triode 32 as shown in wave form 114. The output at cathode electrode 207 is connected to the grid of amplifier 12. The amplified output taken from the plate of tube 12 is differentiated by capacitor 80 and resistor 81, which form differentiator 9, and is fed to the grid of triode 69. Triode 69 in cooperation with triode 70 produces a positive pulse output at the plate of triode 70 for every negative pulse input to the grid of triode 69 which is equivalent to every hundredth negative pulse input to the grid of triode 32, as shown by wave form 115. The outputs from multivibrators 6, 10, and 13 are fed in common through the respective capacitor-resistor circuits to summing amplifier 14 which produces an output as shown by wave form 116. Every tenth pulse in wave form 116 is twice the amplitude of the units pulse and every hundredth pulse is three times the amplitude of the units pulse.

If it is desired to count by tens and hundreds only, for example, in high frequency operation, switch 5 shown in FIG. 1 may be operated disconnecting the units pulse output from summing amplifier 14.

The device of this invention is particularly adapted to low frequency operation where it is desired to record an easily readable signal. A low frequency output signal would be operated on by the circuitry of FIG. 2 to provide easily readable short-width pulses at the output terminal 15 of FIG. 2.

The circuit of FIG. 2 could be modified to read thousands or above by simply adding a series of decade counters in the same manner as shown for tubes 46 and 67. Also, while a decade counter has been found to be of greater efficiency and simplicity of operation, other counters utilizing other powers than ten could be readily inserted in the device of the invention with a few standard modifications.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a frequency measuring device, means responsive to a source of alternating current of random wave form for producing a first pulse train of repetition rate conforming to the frequency of said source, first frequency divider means responsive to said means for producing a first pulse train for producing a second pulse train of a predetermined submultiple rate of said first pulse train, second frequency divider means responsive to said means for producing a second pulse train for producing a third pulse train of a predetermined submultiple rate of said second pulse train, and summing means responsive to said means for producing said first pulse train, said means for producing said second pulse train, and said means for producing said third pulse train, for producing an output signal representative in units, and a predetermined multiple of said units respectively of the total number of pulses in said first pulse train.

2. The frequency measuring device of claim 1 wherein said first frequency divider means divide by ten, said second frequency divider means divide by ten, and said summing means produces an output signal representative in units, tens, and hundreds, respectively, of the total number of pulses in said first pulse train.

3. The frequency measuring device of claim 1 wherein said means for producing a first pulse train of repetition rate conforming to the frequency of said source comprises means for converting the random wave form of said source into a wave form of substantially square waves, means for differentiating the output of said square wave producing means, and means for converting the output of said differentiating means to unidirectional pulses of constant amplitude.

4. A frequency measuring device comprising means responsive to a source of alternating current of random wave form for converting said random wave form into a wave form of substantially square waves, first differentiating means for differentiating the output of said square wave producing means, first switching means for converting the output of said differentiating means to unidirectional pulses of constant amplitude and a rate conforming to the frequency of said source, first scaling means responsive to the output of said first differentiating means for providing a square wave pulse train of a predetermined submultiple rate of the rate of the pulses of said first switching means, second differentiating means for differentiating the output of said first scaling means, second switching means for converting the output of said second differentiating means to unidirectional pulses of constant amplitude and a rate conforming to the submultiple rate of said first scaling means, second scaling means responsive to the output of said second differentiating means for providing a square wave pulse train of a predetermined submultiple rate of said second switching means, third differentiating means for differentiating the output of said second scaling means, third switching means for converting the output of said third differentiating means to unidirectional pulses of constant amplitude and a rate conforming to the submultiple rate of said second scaling means, and summing means responsive to said first, second, and third switching means for producing an output signal representative in units, and predetermined multiples of said units, respectively, of the frequency of said alternating current source.

5. The device of claim 4 wherein said first and second scaling means scale by ten, and said summing means produces an output signal representative in units, ten, and hundreds, respectively, of the total number of cycles of said alternating current source.

6. Means for scaling and counting pulses comprising counting means responsive to a source of alternating current of random wave form for producing a series of pulses of repetition rate proportional to the frequency of said source, first scaling means responsive to said counting means for producing a pulse train of a predetermined submultiple repetition rate of said counting means, second scaling means responsive to said first scaling means for producing a pulse train of a predetermined submultiple repetition rate of said first scaling means, and summing means responsive to said counting means, said first scaling means, and said second scaling means for producing an output signal representative in units and a predetermined multiple of said units of the frequency of said alternating current source.

7. The combination recited in claim 6 wherein said predetermined submultiple rate of said first and second scaling means is ten.

8. In combination, wherein is provided a source of alternating voltage of random wave form, a bidirectional switching circuit for converting said random wave form to a bidirectional square wave form of a constant amplitude and a repetition rate proportional to the frequency of said voltage source, first differentiating means for converting said square wave form to a wave form of bidirectional trigger pulses, first unidirectional switching means for converting said bidirectional trigger pulses to a first square wave form of unidirectional pulses of constant amplitude, each said pulse of said first square wave form representing one cycle of said voltage source, first scaling means responsive to said bidirectional trigger pulses for producing a second square wave form of unidirectional pulses, each said pulse of said second wave form representing a predetermined multiple of said bidirectional trigger pulses, second differentiating means for converting the square wave form out of said first scaling means to a wave form of trigger pulses, second unidirectional switching means for converting said trigger pulses produced by said second differentiating means to a third square wave form of unidirectional pulses of constant amplitude, each said pulse of said third square wave form representing a predetermined number of cycles of said alternating voltage source, second scaling means responsive to the output of said second differentiating means for producing a fourth square wave form of unidirectional pulses, each said unidirectional pulse representing a predetermined multiple of said second square wave form of unidirectional pulses, third differentiating means for converting the output of said second scaling means to a wave form of trigger pulses, third unidirectional switching means for converting the pulses produced by said third differentiating means to a fifth square wave form of unidirectional pulses of constant amplitude, each said pulse of said fifth square wave form representing a predetermined number of cycles of said third square wave form of pulses, and summing means responsive to said first, second, and third unidirectional switching means for producing an output signal representative in units, a first predetermined multiple of said units, and a second predetermined multiple of said units, respectively, of the frequency of said alternating current source.

9. The combination recited in claim 8 wherein the predetermined multiple of said first and second scaling means is ten.

References Cited in the file of this patent

UNITED STATES PATENTS

| | | |
|---|---|---|
| 1,919,803 | Roetken | July 25, 1933 |
| 2,149,829 | Beers | Mar. 7, 1939 |
| 2,501,154 | Berman | Mar. 21, 1950 |
| 2,682,366 | Burgett | June 29, 1954 |
| 2,828,468 | Ball | Mar. 25, 1958 |

OTHER REFERENCES

"A Compact Direct-Reading Audio Frequency Meter," article in Electronics, April 1949, pages 108–109.